UNITED STATES PATENT OFFICE.

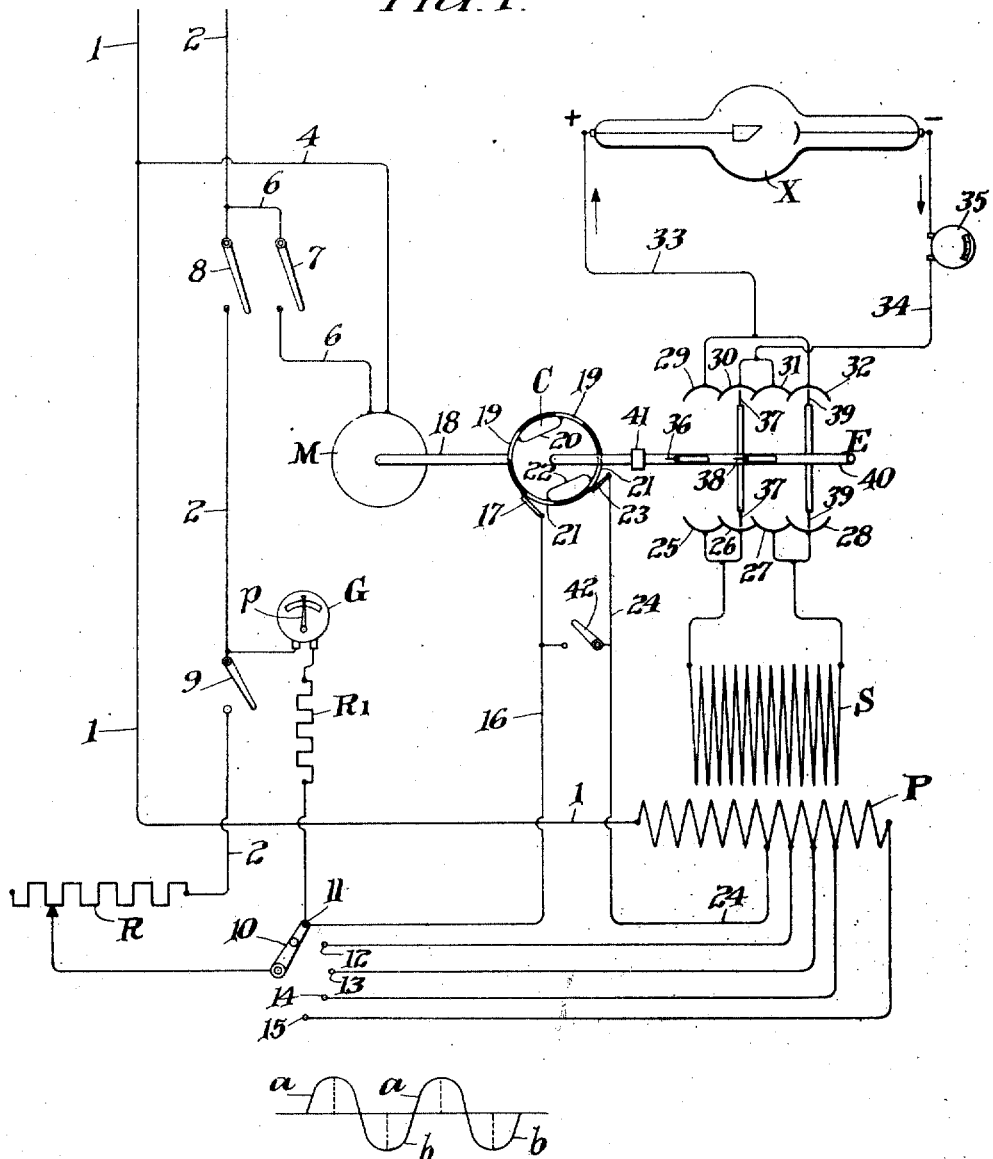

GEORGE H. WHITE, OF HAVERFORD, PENNSYLVANIA.

RECTIFYING APPARATUS.

1,235,746.  Specification of Letters Patent.  Patented Aug. 7, 1917.

Application filed June 4, 1915. Serial No. 32,051.

*To all whom it may concern:*

Be it known that I, GEORGE H. WHITE, a citizen of the United States, residing at Haverford, county of Delaware, State of Pennsylvania, have invented certain new and useful Improvements in Rectifying Apparatus, of which the following is a specification.

My invention relates to apparatus for rectifying alternating current comprising means for indicating the polarity of the rectified current arranged and connected in novel manner hereinafter described and claimed.

Where the alternating current is rectified by a switch driven in synchronism with the alternating current by means of a synchronous motor whose current is derived from the source of alternating current which is to be rectified, the synchronous motor, particularly when of any of the commonly used types, may run in step in either of two positions at an angle of 180 electrical degrees from each other, only a certain one of which insures passage of the rectified alternating current in a predetermined direction in the uni-directional current circuit. With the motor running in the other phase position with respect to the alternating current the rectifying switch will direct the uni-directional or rectified current in the wrong direction in the consumption circuit. And when there is an X-ray tube in the consumption circuit it would mean passage of current through the X-ray tube in the wrong direction, a circumstance which it is highly desirable to avoid, as well known in the X-ray art, because of possible damage to the tube.

It therefore becomes important to know, as soon as the motor is started or before energy is transmitted through the rectifying switch to the X-ray tube, that the energy will pass in the proper direction, and thus avoid even for a short period the passage of the current through the tube in the wrong direction; or stating it otherwise, if the direction of the rectified current can be predetermined, it will be unnecessary to first pass energy through the X-ray tube and determine from the resultant characteristic glow whether such energy is or is not passing in the proper direction, it being well known that energy passed through the X-ray tube in wrong direction causes characteristic glow or other manifestations.

For such purpose it is common to employ a commutator driven in synchronism with the alternating current by the synchronous motor, such commutator delivering only unidirectional current to a galvanometer or other means responsive to uni-directional or direct current which will indicate the direction of current.

In accordance with my invention I employ such a commutator and means responsive to uni-directional current in such manner that the commutator is in series with the primary of the transformer whose high tension secondary delivers the current to be rectified or passed in single direction through a consumption circuit; by such arrangement the commutator may be used for fluoroscopic or similar purposes. And my invention resides in a commutator so employed and in other features of arrangement and connection.

For an illustration of my invention reference may be had to the accompanying drawing, in which:

Figure 1 is a diagrammatic view illustrating an arrangement of circuits and apparatus embodying my invention.

Fig. 2 is a graphic representation of an alternating current explanatory of my invention.

Referring to the drawing, 1 and 2 are the conductors of a circuit supplying single phase alternating current, the same representing also the conductors for supplying the current of one phase of a polyphase system. M represents a synchronous motor of the single phase type, or one phase of a polyphase synchronous motor. One of the terminals of the motor is connected by conductor 4 to the supply conductor 1. The second terminal is adapted to be connected through conductor 6, controlled by switch 7, with the other supply conductor 2.

In the conductor 2 are disposed the switches 8 and 9 which when closed cause the conductor 2 to communicate through the adjustable resistance R with the switch 10 adapted to engage any of the series of contacts 11 to 15 inclusive connected to different points in the primary winding P of a step-up transformer whose secondary is S, the other terminal of the primary P connecting with the supply conductor 1.

G is a galvanometer of any suitable type whose deflecting pointer $p$ will deflect toward the right when uni-directional current flows through it in one direction, and which will deflect toward the left when uni-directional current flows through it in opposite direction. The galvanometer G may be of any suitable type and may be replaced by any other means which will suitably indicate the direction of flow of uni-directional current.

One terminal of the galvanometer G is connected to the conductor 2 while the other terminal is connected through the resistance R¹ with the contact 11. It will be understood that the resistance R¹ need not be employed if the resistance of the galvanometer or device G is itself sufficiently great to suitably limit the current passed through device G.

The contact 11 communicates also through conductor 16 with the brush 17 of the commutator C which is driven by the shaft 18 of the motor M in synchronism with the alternating current. The commutator C comprises the pair of contacts 19, 19 connected together by conductor 20 and the pair of contacts 21, 21 connected together by the conductor 22, the pair of contacts 19, 19 being insulated from the pair of contacts 21, 21. The second brush 23 connects through conductor 24 with a tap in the primary winding P.

One terminal of the secondary S connects to the arcs 25 and 26 of the high tension rectifying switch E of any suitable construction, as for example, that illustrated in Letters Patent of the United States No. 954,056 granted to H. C. Snook. The other terminal of the secondary S connects to the arcs 27 and 28.

Opposed to the arcs 25 to 28 inclusive are the arcs 29 to 32 inclusive, of which 29 and 32 are connected together and through conductor 33 with the anode of the X-ray tube X; and arcs 30 and 31 are connected to each other and through conductor 34 and ammeter 35 with the cathode of the tube X.

Coöperating to connect the arcs 25 and 29 is the cross connector 36; coöperating with the arcs 26 and 30 is the cross connector 37; coöperating with the arcs 27 and 31 is the cross connector 38; and coöperating with the arcs 28 and 32 is the cross connector 39. Cross connectors 36 and 38 are parallel to each other, and cross connectors 37 and 39 are parallel to each other but at right angles to the cross connectors 36 and 38 when the motor M is of the 4-pole type, that is, a motor whose rotating element makes one complete revolution for two cycles of the alternating current supply. These cross connectors are rotated by the rotating element of the motor M as by connecting their shaft 40 by a coupling 41 to the motor shaft 18.

The operation is as follows:

Before starting the apparatus the switches 7, 8 and 9 may be open as illustrated. First the switch 7 is closed to start the motor, which then runs in synchronism with the alternating current supplied thereto.

The motor M, however, may fall into step with, for example, a positive wave or half cycle $a$, Fig. 2, or with a negative wave $b$. Therefore the angular position of the shaft 40 of the rectifying switch E may be the proper position for directing current in proper direction, that indicated by the arrow, through the X-ray tube X, or it may be 90 mechanical degrees or 180 electrical degrees from such proper position, depending upon whether the motor M fell into step with a positive wave as $a$ or a negative wave as $b$, the points located similarly in neighboring waves $a$ and $b$ being 180 electrical degrees from each other.

The motor M having been started as described, the switch 8 is closed, or the switch 8 may be closed simultaneously with the switch 7, the switch 9 remaining open. In such case there is a circuit from supply conductor 1 through a part of the primary P, through conductor 24, through the commutator C, through conductor 16 to contact 11, and thence through resistance R¹ and galvanometer G to supply conductor 2. The effect of the commutator C, rotated in synchronism with the current by motor M, is to suppress all the alternating current waves of one sign allowing only the alternating current waves of the other sign to flow through the instrument G. This means that only uni-directional current flows through the instrument G and its pointer $p$ will deflect toward the right or the left according to the direction of the uni-directional current flowing through the instrument. The current passing through instrument G passes also through the primary P, but is so small in magnitude as not to cause the secondary S to deliver energy to tube X.

With the commutator segments or contacts having the angular extent illustrated practically a half only of each of the alternating current waves of one sign will be passed through the instrument G. However, my invention is in no way limited to the angular extent of the commutator segments or contacts, the same serving for a further use for fluoroscopic purposes, that is, for causing only part of the alternating current energy to be rectified and delivered to the X-ray tube.

If the pointer $p$ deflects to the left, for example, it indicates that the direction of the rectified current through the X-ray tube X will be in the wrong direction if the switch 9 should be closed.

The operator accordingly momentarily opens and immediately closes the switch 7, which will cause the rotating element of the motor M to drop back 180 electrical degrees and then continue to run in synchronism with the current at 180 electrical degrees or 90 mechanical degrees back of its former position. This will cause the commutator C to direct energy of the alternating current waves of other sign through the galvanometer G whose pointer will then deflect to the right, indicating that the current rectified by the switch E will pass in the right or proper direction, indicated by the arrow, through the tube X.

The switch 9 is then closed, whereupon current will then pass from conductor 1 through a part of the primary P through conductor 24, through the commutator C, conductor 16, to contact 11, through the instrument G as before, but also through the switch 10 and resistance R to the conductor 2. This will energize the primary P whose secondary S will then deliver high potential energy which will be rectified by the switch E and directed in proper direction through the X-ray tube X.

By this means no energy will have been passed through the X-ray tube X before the conditions have been made such that the energy must pass therethrough in the proper direction; and therefore the effects upon tube X of current of wrong direction is completely avoided.

When the commutator C is in circuit, as it is when the switch 10 is on contact 11, the smallest number of turns of the primary P are in circuit, a condition suitable for producing the highest potential at the terminals of the secondary S, such highest potential being suitable for fluoroscopic work because of the greater penetration of the X-rays produced. And with the switch 10 in this position the commutator C operates to completely suppress all alternating current waves of one sign and to pass energy from only approximately one-half of each of the alternating current waves of opposite sign.

In this particular example illustrated the commutator C closes the circuit of the primary P at substantially the maximum and breaks it at substantially the zero point of each of the alternating current waves of one sign.

However, the commutator C may be entirely cut out after the direction of rectified current is properly determined, as by closing the switch 42, in which case each of the alternating current waves of both signs will pass through a part of the primary P and the rectifying switch E will pass energy from each wave through the X-ray tube always in the direction of the arrow.

When the switch 10 is moved to the contact 12 the commutator C is cut out of operation so far as concerns current whose energy is passed through tube X. In this position of the switch 10 a greater number of turns of the primary P are used. And greater and greater number of turns of the primary P are used as the switch 10 engages contacts 13, 14 and 15.

It will accordingly be understood that by using the galvanometer or indicating instrument G as described, it may be determined whether the shaft 40 of the rectifying switch is in proper angular relation with respect to the coöperating arcs to pass energy in the proper direction through the tube. By changing the step of the motor M, as described, the effect is to cause the cross connectors 36 and 38, if the instrument G indicates the wrong direction, to take the relative angular position previously occupied by the cross connectors 37 and 39.

While my invention is of particular value in a system where there is an alternating current supply and a synchronous motor employed, it is also applicable to the case where there is a source of direct current which is delivered to a direct current motor which drives an alternating current generator or which is delivered to the direct current side of an inverted rotary or rotary converter, in which case the commutator C and the instrument G may be used to indicate or predetermine the direction of unidirectional or rectified current which will flow in the consumption circuit. In these cases the commutator C and the switch E will be driven in fixed relation with the rotating element of the alternating current generator or inverted rotary converter.

What I claim is:

1. The combination with a source of alternating current, of a transformer receiving energy from said source, a switch in the secondary circuit of said transformer driven in synchronism with the alternating current, a commutator connected in series with the primary winding of said transformer and driven in synchronism with the alternating current, and means for indicating uni-directional current flow connected in circuit with said commutator.

2. The combination with a source of alternating current, of a transformer receiving energy from said source, a switch in the secondary circuit of said transformer driven in synchronism with the alternating current, a commutator connected in series with the primary winding of said transformer and driven in synchronism with the alternating current, means for indicating unidirectional current flow connected in circuit with said commutator, and means for passing energy from said source through said commutator independently of said indicating means.

3. The combination with a source of alternating current, of a transformer receiving energy from said source, a switch in the secondary circuit of said transformer driven in synchronism with the alternating current, a commutator connected in series with the primary winding of said transformer and driven in synchronism with the alternating current, means for indicating unidirectional current flow connected in circuit with said commutator, means for passing energy from said source through said commutator independently of said indicating means, and means for short circuiting said commutator.

4. The combination with a source of alternating current, of a transformer receiving energy therefrom, a switch in the secondary circuit of said transformer driven in synchronism with the alternating current, a commutator driven in synchronism with the alternating current and suppressing all current waves of one sign, means for indicating direction of current flow connected in series with said commutator, said commutator connected in series with the primary winding of said transformer, and means for passing energy through said commutator to said primary winding independently of said indicating means.

5. The combination with a source of alternating current, of a transformer receiving energy therefrom, a switch in the secondary circuit of said transformer driven in synchronism with the alternating current, a commutator driven in synchronism with the alternating current and suppressing all current waves of one sign, means for indicating direction of current flow connected in series with said commutator, the primary winding of said transformer having a plurality of sections, said commutator connected in series with one of said primary sections, and switching means for admitting energy to the transformer primary through said commutator independently of said indicating means.

6. The combination with a source of alternating current, of a transformer receiving energy therefrom, a switch in the secondary circuit of said transformer driven in synchronism with the alternating current, a commutator driven in synchronism with the alternating current and suppressing all current waves of one sign, means for indicating direction of current flow connected in series with said commutator, the primary winding of said transformer having a plurality of sections, said commutator connected in series with one of said primary sections, and switching means in one position admitting energy to said transformer primary through said commutator independently of said indicating means and in another position admitting energy from said source through another section of said primary winding.

7. The combination with a source of alternating current, of a transformer receiving energy therefrom, a synchronous motor driven from said source, a rectifying switch in the secondary circuit of said transformer driven by said synchronous motor, a commutator suppressing all the current waves of one sign driven by said synchronous motor, means for indicating direction of current flow connected in circuit with said commutator, said commutator connected in series with the primary of said transformer, and means for admitting energy from said source to said primary winding through said commutator independently of said indicating means.

8. The combination with a source of alternating current, of a transformer receiving energy therefrom, a synchronous motor driven from said source, a rectifying switch in the secondary circuit of said transformer driven by said synchronous motor, a commutator suppressing all the current waves of one sign driven by said synchronous motor, means for indicating direction of current flow connected in circuit with said commutator, said commutator connected in series with the primary of said transformer, and switching means in one position admitting energy from said source through said commutator to said primary winding independently of said indicating means and in another position admitting energy from said source to said primary winding independently of said commutator.

In testimony whereof I have hereunto affixed my signature this 3rd day of June, 1915.

GEORGE H. WHITE.